Nov. 19, 1963  H. WATANABE  3,111,478
MOLDED METAL-METAL SALT REFERENCE ELECTRODE
Filed March 3, 1958
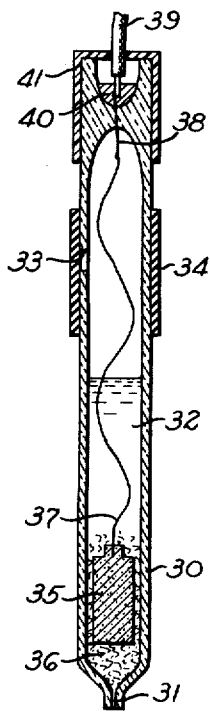
Fig. 4.
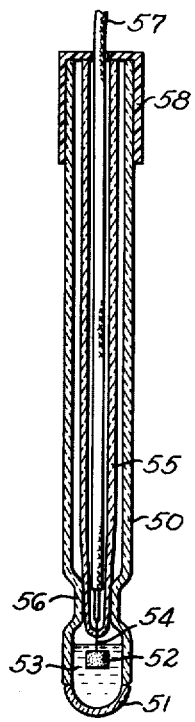
Fig. 5.
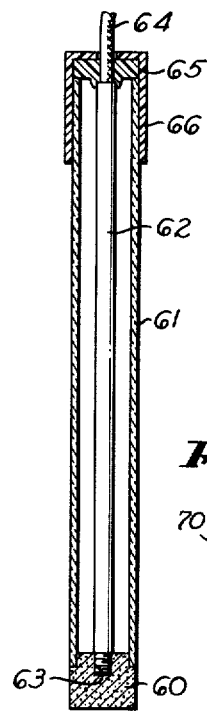
Fig. 6.
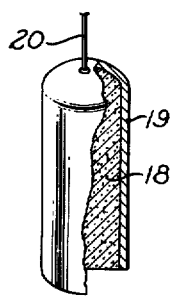
Fig. 2.
Fig. 1.
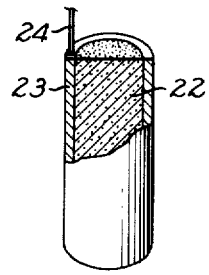
Fig. 3.
Fig. 7.
INVENTOR.
HIDEO WATANABE
BY HIS ATTORNEYS.
HARRIS, KIECH, FOSTER & HARRIS United States Patent Office 3,111,478
Patented Nov. 19, 1963

3,111,478
MOLDED METAL-METAL SALT REFERENCE ELECTRODE
Hideo Watanabe, Fullerton, Calif., assignor to Beckman Instruments, Inc., a corporation of California
Filed Mar. 3, 1958, Ser. No. 718,826
6 Claims. (Cl. 204—195)

This invention relates to an electrode component for the measurement of electromotive force which includes a metal and a salt of the metal that will produce an electromotive force when inserted into a solution of the salt. In the application of this type of electrode, the salt is usually only sparingly soluble and is in equilibrium with its saturated solution, the solution forming a portion of the complete electrode system. The voltage generated by the electrode component when inserted into the solution is a function of the concentration of ions in the solution of the species formed by the salt. For example, the potential E generated by a silver-silver chloride electrode referred to a standard hydrogen reference electrode varies as a function of chloride ion concentration according to the relationship, at 25° C., $$E = 0.222 - 0.059 \log (Cl^-)$$

Half cells containing this type of electrode component are widely used in reference electrodes for pH measuring equipment. Such electrode components may also be used as the internal electrode of a half cell having a glass membrane as an indicating electrode for the measurement of hydrogen ion concentration or pH, such assemblies being known as the glass electrode. Electrode components of the invention may also be used by direct immersion in a sample to determine the amount of particular kinds of ions present in a solution. For example, a silver-silver chloride electrode as indicated above, when placed in a solution of an unknown chloride ion content develops a potential indicative of the amount of chloride ion present. Such an electrode may also be used to measure silver ion concentration. Such applications, the electrode component and the sample solution taken together may be considered to comprise a half cell. These electrode components also have other uses, such as a reference standard in corrosion studies and for direct current conductance measurements.

Electrode components manufactured by the conventional methods often deteriorate seriously during use or develop erratic behavior. These electrode components usually comprise a relatively thin layer of the salt on a supporting surface of the metal and provide only a limited bulk of electrochemically active material. The thin layers are particularly susceptible to physical deterioration upon temperature cycling, due largely to the different coefficients of expansion of the metal and the salt. The limited active amounts of salt will in time go completely into solution, particularly when exposed constantly to fresh solutions, resulting in a useless electrode. Also, the conventional salt layers of these electrodes are porous or granular in some degree, and thus form pockets of solution, adjoining the metal, which cannot equilibrate rapidly in ionic composition with the main body of solution. Since fundamentally the developed potential is determined by the concentration of ions directly contacting the metal, this results in slow equilibration of the electrode potential when the composition of the main body of solution is changed, or when the temperature changes. It is an object of the invention to provide an electrode component which overcomes these disadvantages and one which is extremely rugged and resistant to mechanical influences and to temperature cycling. A further object of the invention is to provide an electrode component which has a large amount of active material and one in which the salt is dispersed through the body of the electrode.

It is another object of the invention to provide a substantially nonporous electrode component in which the portions of the metal and salt which are electrochemically operative lie entirely in the surface of the component, hence equilibrate very rapidly with the body of solution in which the component is immersed. Such nonporous electrodes are especially valuable in applications where they must be immersed in solutions that vary in concentration, or where appreciable temperature change effects are encountered.

It is a further object of the invention to provide an improved method for the manufacture of the electrode components in which the components may conveniently be made in any desired shape and size. Another object is to provide a method in which the electrodes may be manufactured with a minimum of manual labor and time and consequently at low cost. A further object of the invention is to provide electrode components having high uniformity of electrical characteristics and high electrical stability. Another object of the invention is to provide electrode components which are easily and ruggedly attached to the necessary electrical leads.

It is an object of the invention to provide electrode components which may be easily and quickly restored to their original condition after surface contamination or deterioration.

Briefly, the electrode component of the invention is produced by intimately mixing the metal and metal salts together in powdered form and pressure molding the resulting mixture into a coherent unitary mass of the desired form and dimensions.

In the drawing:
FIG. 1 is an isometric view in section of a preferred form of the invention;
FIG. 2 is an isometric view, partly in section, of an alternative form of the invention;
FIG. 3 is an isometric view, partly in section, of another alternative form of the invention;
FIG. 4 is a sectional view of a reference electrode utilizing an electrode component of the invention;
FIG. 5 is a sectional view of a glass electrode utilizing an electrode component of the invention;
FIG. 6 is a sectional view of a halogen ion measuring electrode utilizing an electrode component of the invention; and
FIG. 7 is a sectional view of an alternative form for the electrode component of the structure of FIG. 6.

The particular materials used in the electrode component of the invention are not pertinent to the invention, the choice of metals and metal salts being limited only by those which will work electrochemically in the particular application to produce an electromotive force indicative of the condition being investigated. The same materials which are used in conventional electrode components may be utilized, although, other factors being equal, preference will usually be given to metal-metal salt combinations having superior pressure molding properties. Silver and silver chloride are found to form one of the most useful metal-metal salt combinations and to behave excellently in molding. Other silver-silver halide electrodes are in use, for example, the iodide and the bromide electrodes, though not as widespread as the chloride type. Also, silver-silver sulfide electrodes have found some use. Examples of combinations comprising other metals which may be found useful are coppercopper sulfide and bismuth-bismuth fluoride. The features of the invention are applicable to any of the metalmetal salt combinations used in the electrochemical electrodes.

In a preferred method of making the electrode component of the invention, herein exemplified in a silver-silver chloride electrode, a quantity of silver metal powder, preferably precipitated grade which has a very fine particle size, and a quantity of silver chloride powder, preferably of reagent grade, are intimately mixed together. During the mixing of the powdered metal and salt, excessive pressures should be avoided as they may cause premature fusion of the silver particles. While the ratio of the two components of the mixture is not critical, a preferred range of ratios of silver to silver chloride is 30–70 to 70–30 by weight. Ratios ranging from 20–80 to 80–20 have also been tried and all found workable. Indeed it is believed that ratios in either direction substantially surpassing these extremes would also be operative, since the ratio is strictly nonlimiting from the electrochemical point of view. In the case of certain metal-salt combinations, however, mechanical factors such as molding characteristics may come into play.

The metal-metal salts mixture is compacted or pressure molded in a die to produce a coherent unitary mass which is the desired electrode component 10 (FIG. 1). The die is preferably cylindrically shaped but any desired form may be used. The ram pressure used with the die is not critical. Pressures ranging from 5,000 to 100,000 pounds per square inch have been used, for example, on silver-silver chloride mixtures, the finished product retaining some porosity in the lower end of this pressure range, but being substantially nonporous at higher pressures.

It is preferred that those parts of the die and ram which come in contact with the mixture be made from an inert material which will not contaminate the electrode component. Rhodium plated parts are suitable for silver-silver chloride electrodes because of the hardness and chemical inertness of the rhodium plate.

It has been found that the electrode component can be formed at lower pressures by the simultaneous application of heat and pressure to the mixture. For example, with the mixture heated to about 250° C., the pressure required to produce a particular electrode component will be about one-half that required for the same component at room temperature. The temperature of the mixture should be kept below that at which the salt melts.

An electrical lead 11 which may be a silver or platinum wire, may be attached to the electrode component 10 by forming a hole 12 in the component, either during the pressure molding step or following it. An end of the lead wire is inserted into the hole and the electrode component is compressed or deformed locally as at 13, about the hole to clamp the wire therein forming an electrical and mechanical contact with the wire.

An alternative form of the invention is shown in FIGS. 2 and 3, the metal-metal salt mixture being compressed into a receptacle which forms an integral part of the finished electrode component. The receptacle is preferably made of an inert material which will not react with or contaminate the electrode component or the solutions in which it is used, and which will not alter the electrochemical behavior of the component. Silver, gold, platinum and other similar metals may accordingly be used for the receptacle.

In the embodiment of FIG. 2, the metal-metal salt mixture 18 is pressure molded into a cup-shaped receptacle 19, after which an electrical conductor 20 is attached to the receptacle by suitable means, such as by soldering. In the embodiment of FIG. 3, the metal-metal salt mixture 22 is compressed into a coherent mass within a length of cylindrical tubing 23 and a lead 24 is attached to the tubing adjacent one end.

FIG. 4 illustrates the use of the elecrode component of the invention in a reference electrode. A glass tube 30 has a narrow opening 31 formed at its lower tip, which opening serves as a liquid junction between a solution 32 within the tube and the sample medium in which the electrode is to be placed. An opening 33 in the wall of the tube 30 permits filling with the solution and a rubber sleeve 34 is slidably mounted on the tube for closing the opening 33. An electrode component 35, which may be the unit of FIG. 1, is supported in the lower end of the tube 30 by a body of glass wool 36. A silver condutor 37 provides an electrical connection between the electrode component 35 and a platinum terminal 38 which is sealed in the upper end of the tube. A lead wire 39 is connected to the upper end of the terminal 38 and this junction is encased in a body of solder 40. The top of the tube is covered with a protective cap 41 through which the lead 39 extends.

FIG. 5 illustrates a glass electrode assembly for pH measurements utilizing the electrode component of the invention. A glass tube 50 is provided with a sensitive glass membrane 51 of conventional form at its lower end. An electrode component 52 is suspended in an electrolyte 53 by a platinum wire 54 which is sealed in the bottom end of a glass tube 55 positioned within the tube 50. The tube 55 is supported within the tube 50 at a restriction 56 formed in the outer tube, the two tubes being cemented together at this restriction to seal the electrolyte 53 in the lower end of the outer tube. An electrical conductor 57 positioned within the tube 55 provides electrical connection between the wire 54 and the external circuit. A protective cap 58 encloses the upper ends of the tubes with the conductor 57 passing therethrough.

The electrode of FIG. 6 is especially suitable for the measurement of certain ions, for example, halogen ions in solutions. Assuming the metal-salt combination is silver-silver chloride, this electrode is specifically useful for chloride ion measurement. An electrode component 60, such as that of FIG. 1, is pressed or otherwise fitted into the lower end of a tube 61. A conductor, which may be a rod 62 of silver, is positioned within the tube 61 with one end thereof engaging the electrode component 60 in a suitable manner, such as by being threaded into an opening 63 formed in the electrode component 60. A lead wire 64 is connected to the upper end of the rod 62. A centering washer 65 is positioned around the rod 62 at the upper end thereof and is held in place by a cap 66 which closes the upper end of the tube 61.

With the electrode assembly of FIG. 6, the electrode component 60 is inserted directly into the solution being analyzed. When the outer surface of electrode component 60 becomes contaminated or becomes inoperative, it may be restored to its original condition by abrading the surface with emery paper or the like, providing a fresh metal-metal salt surface. Thus, the working surface of the electrode can be renewed a large number of times, greatly increasing the life of the electrode assembly.

An electrode component of the form of component 60 illustrated in FIG. 6 was in one embodiment made from a 50–50 mixture (by weight) of silver and silver chloride. Both substances were the commercially available "analytical grade, precipitated," five grams of each being used. The die was adapted to mold the body, shoulder, and thread of the pellet in a single molding operation, the applied pressure at room temperature being 30,000 p.s.i. The component 60 of FIG. 6 in another case was made from a mixture of silver and silver bromide, using the same proportions and molding conditions.

The component 60 was also successively made in silver-silver iodide, using the same molding conditions, and in ratios by weight of silver to silver iodide varying from 90–10 to 60–40. A silver-silver sulfide component was also made, comprising 90% by weight silver to 10% silver sulfide, by molding at 100,000 p.s.i. at room temperature. The silver-silver sulfide electrode component was made in the form in FIG. 7, where the thread-forming part of the mold is filled with silver powder only, and the remainder of the mold is filled with the silver-silver sulfide mixture. The resulting electrode component has a silver portion 70 of high mechanical strength with a threaded opening 71 formed therein, and a silver-silver sulfide portion 72 of lesser mechanical strength, the interface between the two portions forming an excellent bond.

A copper-copper sulfide electrode component was made with a mixture of 97% copper to 3% copper sulfide (both precipitated grade) the quantities being respectively 10 grams and 0.29 gram, and the pressure at room temperature being approximately 100,000 p.s.i.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. A method of making an electrode component for the measurement of electromotive force, which electrode component includes a metal and a sparingly soluble salt of the metal, the method comprising: mixing the metal and salt together in powdered form; placing the resulting mixture in a receptacle; and pressure molding the mixture in the receptacle into a substantially nonporous, coherent mass integral with the receptacle.

2. A method of making an electrode component which includes a metal and a salt of the metal that will produce an electromotive force when inserted into a solution of salt, the method comprising: mixing the metal and salt together in powdered form; pressure molding the resulting mixture into a substantially nonporous, coherent unitary body having an opening in one surface thereof; inserting an end of an electrical conductor into said opening; and compressing the body locally adjacent the opening forming the body about the end of the conductor.

3. A method of making an electrode component for the measurement of electromotive force, which electrode component includes a metal and a sparingly soluble salt of the metal, the method comprising: mixing the metal and salt together in powdered form to produce a mixture; filling a first zone of a die with the metal in powdered form and a contiguous second zone of the die with the mixture; and pressure molding the die contents into a substantially nonporous coherent unitary body.

4. An electrode component formed of a powdered metal and a powdered salt of the metal which will produce an electromotive force when inserted into a solution of salt, the electrode component comprising a mixture of the metal and metal salt compressed into a substantially nonporous integral mass.

5. In an electrode component for the measurement of electromotive force, the combination of: an electrically conductive receptacle; and a mixture of a powdered metal and a powdered salt of the metal which will produce an electromotive force when inserted into a solution of salt, with the mixture compressed into said receptacle in a substantially nonporous body integral with said receptacle.

6. An electrode component of a metal and a salt of the metal that will produce an electromotive force when inserted into a solution of salt, the electrode component comprising a compacted, substantially nonporous, unitary body having a first zone of powdered metal and a contiguous second zone of a homogeneous mixture of powdered metal and metal salt.

References Cited in the file of this patent
UNITED STATES PATENTS

| | | |
|---|---|---|
| 692,298 | Jungner | Feb. 4, 1902 |
| 1,711,462 | Wescott | Apr. 30, 1929 |
| 2,672,441 | White | Mar. 16, 1954 |
| 2,747,231 | Reinhardt | May 29, 1956 |
| 2,799,051 | Coler et al. | July 16, 1957 |

UNITED STATES PATENT OFFICE

CERTIFICATE OF CORRECTION

Patent No. 3,111,478                          November 19, 1963

Hideo Watanabe

It is hereby certified that error appears in the above numbered patent requiring correction and that the said Letters Patent should read as corrected below.

Column 1, line 41, for "Such applications" read -- In such applications --; column 3, line 49, for "deforemed" read -- deformed --; line 70, for "elecrode" read -- electrode --; column 4, line 6, for "condutor" read -- conductor --; line 18, for "platium" read -- platinum --; line 71, after "form" insert -- shown --; column 6, line 7, after "nonporous" insert a comma; line 35, for "May 29, 1956" read -- May 29, 1957 --.

Signed and sealed this 30th day of June 1964.

(SEAL)
Attest:

ERNEST W. SWIDER                          EDWARD J. BRENNER
Attesting Officer                           Commissioner of Patents